United States Patent Office 3,411,573
Patented Nov. 19, 1968

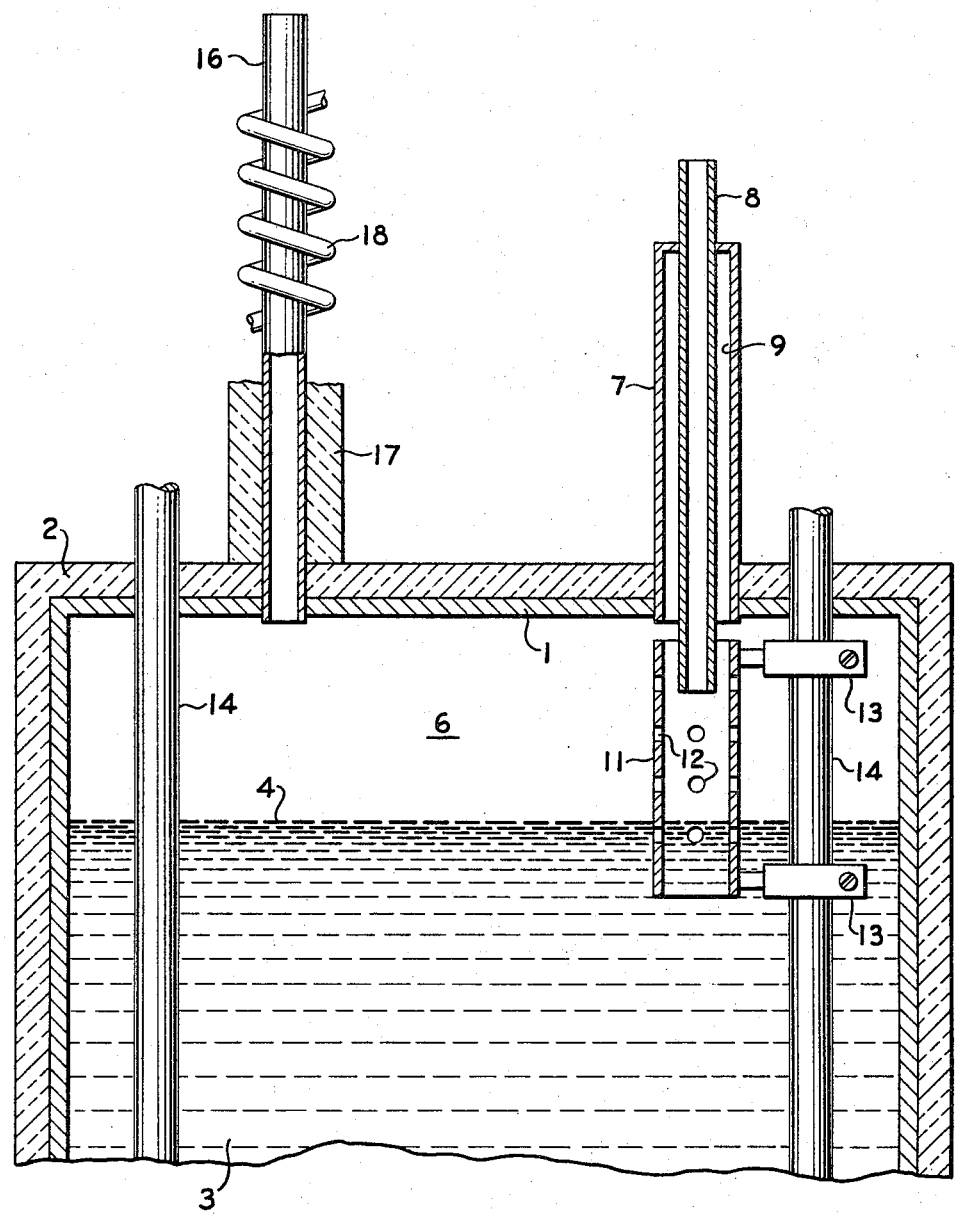

3,411,573
AIR REPLACEMENT IN HEAT-STORAGE CONTAINERS
Willis Thompson Lawrence, Arlington, Mass., assignor, by mesne assignments, to Hooker Chemical Corporation, Niagara Falls, N.Y., a corporation of New York
Filed Nov. 7, 1966, Ser. No. 592,475
6 Claims. (Cl. 165—134)

ABSTRACT OF THE DISCLOSURE

Natural breathing apparatus for a heat storage assembly which involves tubes extending from a space above the heat storage material, through the container to air. The breather tubes are adapted to provide a substantially unidirectional flow of air in one tube and out another. This breathing action is created by heating one tube and not another tube or by extending one tube to a height above the other tube to create a chimney effect. Heating for one tube may be provided by known means or through insulation or a heating coil. The breather tube through which air enters the heat storage container is constructed to prevent any air blocking formation of carbonate within the breather by providing a tubular carbonate trap below the point at which air enters the space above the heat storage material. Likewise the creeping action of the heat storage material is blocked by providing an external tube about the breather which extends away from the heat storage apparatus to a sufficient distance to solidify the creeping storage material and/or carbonate before it can pass into the inlet breather.

---

This invention relates to heat-storage apparatuses of the type comprising containers for substantially anhydrous alkali metal hydroxide heat-storage material mixed with a minor percentage of a corrosion inhibitor. More particularly this invention relates to an apparatus and method for maintaining the effectiveness of the corrosion inhibitor over a life expectancy of 20 or more years.

In the heat storage use of an alkali metal hydroxide composition, the composition is heated to a high temperature (about 900 to 1200 degrees Fahrenheit) and the stored heat is subsequently withdrawn for use in the manner and rate desired. For reasons of structural strength, economy and other desirable properties, the container is preferably made of steel, most preferably low carbon steel. Among the most effective materials for heat storage are the alkali metal hydroxides such as sodium, lithium and potassium hydroxides in combination with a corrosion inhibitor such as alkali metal nitrate, chromates and manganates. The combination of sodium hydroxide and sodium nitrate is particularly desirable.

It is believed that the inhibitor minimizes corrosion by oxidizing the inner surface of the steel container thereby forming a film of iron oxide. To maintain the efficacy of the inhibitor, the oxygen removed from the inhibitor in the oxidizing process should be replaced.

Inasmuch as the heat-storage material when heated expands more rapidly than the containers, an air space is provided above the material at the top of each container. This air space is normally vented to avoid excessive pressures during heating or sub-atmospheric pressures while heat is being withdrawn from the heat storage composition. The air space also serves as a reservoir for oxygen used to maintain the heat-storage material in an oxidizing condition and thus, retain the efficiency of the corrosion inhibitor by in situ rejuvenation thereof. While the heat storage composition is being heated, air is exhaled through the venting means, and while the composition is being cooled air is inhaled. During inactive periods of little or no temperature change, this breathing function substantially ceases. Previous methods for keeping the oxygen in the aforesaid space replenished responded solely to changes of temperature and volume within the container, but did not provide for oxygen replacement during periods of little or substantially no change in temperature.

In utilizing an alkali metal hydroxide as a heat storage material, the characteristic or propensity of the molten alkali metal hydroxides for spreading over the surface of metals is recognized, especially where a venting system is used. Such a heat-storing medium will creep over all metal surfaces to which it has access and which are at a temperature above the melting point of the medium. The opening from the clearance space will ordinarily be connected to a breathing tube of relatively small diameter which extends throgh thermal insulation around the container and opens to the ambient air. When the medium and container are hot, a temperature gradient will exist along the length of the tube. When the medium is molten, a temperature corresponding to the melting point of the medium will exist at some point between the hot and cool ends of the breather tube. The molten medium will thus creep over the inside surfaces of the tube to this point, at which it solidifies and does not creep farther.

Coupled with this creeping problem is the affinity of all alkali metal hydroxides for carbon dioxide ($CO_2$). The reaction between the hydroxide and $CO_2$ results in the formation of the corresponding alkali metal carbonate. Air normally contains about .03% $CO_2$, and may sometimes contain considerably more as a result of the combustion of carbonaceous materials or respiration. When air is drawn inward as the medium cools, the $CO_2$ is converted to carbonate where it first encounters the alkali metal hydroxide in the breathing tube. The carbonates have higher melting points than the corresponding hydroxides and therefore the carbonates form solid deposits, which are porous enough to soak up molten hydroxide which in turn absorbs more $CO_2$. The carbonate deposit thus continues to grow until it can finally block the tube and prevent further breathing. If the medium is deprived of oxygen it tends to become excessively corrosive and, if the tube is closed, dangerous pressures may develop in the container.

Another pertinent characteristic of the alkali metal hydroxides is their affinity for water, which is exceedingly high when they are at, or near, room temperature, but very low when they are molten. Some heat storage systems, e.g., those used in connection with space heating of houses and other buildings may remain, for several months at a time at room temperature during periods of comparative inactivity. During such periods a small but normally insufficient amount of breathing occurs as a result of barometric pressure and temperature changes in the ambient air.

An object of this invention is to provide an apparatus which changes the air in the aforesaid space while the temperature in the container is relatively constant as well as when the temperature is fluctuating. Another object of this invention is to provide a breather apparatus which is simple and economical to produce, requires a minimum maintenance, and which is durable and reliable in use. A further object of this invention is to provide surface means wherein carbonate deposits may form harmlessly and the means for periodic removal of such deposits automatically as a result of the thermal cycling of the heat-storing medium when in operation. These and other objects will become apparent to those skilled in the art from the description of the invention which follows.

In accordance with the invention, a heat-storage apparatus is provided comprising a container, heat-storage material in said container with a space above the material, said container being formed of steel and said heat storage material comprising an alkali metal hydroxide and a corrosion inhibitor which, with iron, forms a film of iron oxide to protect the steel against corrosion, a plurality of conduit means leading from said space to the outside, said means producing circulation of air from the outside inwardly through one conduit and outwardly through another conduit, thereby to replace the oxygen in the corrosion inhibitor which is used in the oxidizing process. The aforesaid circulation may be produced by means which establish a difference in temperature between the two conduits with the warmer conduit extending upwardly from the container, thereby producing a draft inwardly through the cooler conduit and outwardly through the warmer conduit, or the outer end of one conduit may be higher than the outer end of the other conduit, thereby to produce a chimney or equivalent effect, or both.

In a preferred aspect, the invention involves a heat-storage system comprising an enclosed or covered container, heat-storage material in said container with a space above the material in the upper part of the container, said material being absorptive of carbon dioxide to form carbonates having melting points higher than that of the heat storage material, a wall of insulation around the container, tubular breather means extending from said space through said wall, said tubular means including a tube of small diameter and a tube of relatively large diameter, the outer end of the large tube being closed by sealing around the small tube and the container being closed except for said tubular means, said material, when molten, tending to creep outwardly along the surface of said large tube, the large tube extending higher than the location where its temperature reaches the melting point of said material, said container being formed of steel and said material comprises a corrosion inhibitor which tends to oxidize the steel to iron oxide and form a film of iron oxide to protect the steel against corrosion, a conduit leading from said space to the outside, and means to produce circulation of air from the outside inwardly through said small tube and outwardly through said conduit, whereby oxygen from the air continuously replaces the oxygen in the corrosion inhibitor which is used in the oxidizing process.

The invention will be more fully described by reference to the drawing which is a partial sectional view of a heat storage container having thereon the apparatus of the present invention.

The heat storage container 1 is covered with insulation 2 and is filled with a heat-storage material 3 up to level 4, leaving a space 6 in the upper part of the container. Leading upwardly from this space is a tube 7, the upper end of which is closed except for an opening which is sealed around a smaller tube 8 leading to the outside atmosphere. The large tube 7 extends above location 9 where its temperature drops to the melting point of material 3. Thus, the material creeping up the inner surface of the container and thence along the surface of tube 7 cannot reach small tube 8. At location 9, some of the $CO_2$ in the air entering the breather tube is absorbed by the film of heat-storage material on tube 7 forming an accumulation of sodium carbonate. If this accumulation occurred in the small tube it would soon plug the tube, but with a large tube there is no danger of plugging for a long period of time, particularly because of accumulator tube 11 on which most of the carbonates are formed. Accumulator tube 11, having perforations 12, is located below tube 7. Tube 11 is supported by clamps 13 on one of the two heating units 14 used to reheat material 3 when its temperature drops to the lower end of its useful range. While material 3 may creep up tube 7 to location 9, most of the carbonate accumulates on accumulator tube 11 just above level 4 so that, as the liquid rises and falls during alternate heating and cooling periods, the carbonate is dissolved by the heat storage material and returned to the body thereof.

According to this invention a second tube 16 leads upwardly from space 6 to the outside of the container. Tube 16 comprises means for producing circulation of air inwardly through tube 8 and outwardly through tube 16. This circulation is produced by various methods and means. One means is to extend tube 16 higher than tube 8 to produce a chimney effect. Another means is to heat or otherwise retain tube 16 warmer than tube 8, thereby producing an updraft. This can be accomplished in various ways as by added insulation 17 and/or by a heating means such as coil 18.

By drawing the air inwardly through the tubular means disclosed herein and exiting air outwardly through tube 16, carbonate does not tend to form in outlet tube 16. The present apparatus thus increases the flow of air through the heat storage container, thereby retaining the corrosion inhibitors therein in oxidizing form, while eliminating or greatly reducing the problems accompanying the passage of air through such heat storage containers.

The following example illustrates certain preferred embodiments of the present invention. Unless otherwise indicated, all parts and percentages are by weight and all temperatures are in degrees Fahrenheit.

EXAMPLE

The apparatus of the present invention was constructed in accordance with the drawing using mild steel for the metal container and breather tubes. The container was filled to within about three to four inches from the top thereof, with a substantially anhydrous alkali metal hydroxide composition comprising about 89 percent sodium hydroxide, 8 percent sodium nitrate and about 2 percent sodium chloride, the remainder being primarily sodium carbonate.

In the operation of the heat storage unit, the composition is heated as high as about 1200 degrees Fahrenheit, but normally, only to about 900 degrees Fahrenheit, and cooled to about 300 degrees Fahrenheit by withdrawing heat therefrom. Using the apparatus of the present invention, an inward flow of air is detected passing through tube 8 and an outwardly flow of air is detected passing through tube 16. Correspondingly good flows of air are obtained when tube 16 is extended to a length longer than tube 8, when tube 16 is insulated to retain a higher temperature than tube 8 and when heating means are placed about tube 16 to maintain a higher temperature thereof.

In the same manner, elements 7, 8 and 16 are made of nickel, monel and the like corrosive resistance metals with correspondingly good results.

It should be understood that the present disclosure is for the purpose of illustration only and that this invention includes all modifications and equivalents which fall within the scope of the appended claims.

What is claimed is:

1. A heat storage apparatus comprising a container partially filled with a heat storage material comprising an alkali metal hydroxide and a corrosion inhibitor, and plural conduit means leading from the space above said heat storage material to communicate with ambient air, said conduit means comprising an inlet conduit and an outlet conduit producing a circulation of air into and out of said space, said inlet conduit comprising a tubular breather disposed within a tubular sleeve, said sleeve being sealed to the container wall and to the breather at a point more distant from said container than the distance at which its temperature reaches the melting point of said heat storage material.

2. The apparatus of claim 1 in which said outlet conduit extends upwardly from said container and comprises means for producing a warmer temperature relative to said inlet conduit, to create a draft circulating air through said space.

3. The apparatus of claim 1 in which said outlet conduit extends from said container to a higher point than the outer end of the inlet conduit, thereby producing a chimney effect.

4. The heat storage apparatus of claim 1 in which said heat storage material is substantially anhydrous.

5. The heat storage apparatus of claim 1 in which said container comprises an insulated steel container.

6. The apparatus of claim 1 in which an accumulator tube is disposed below the portion of the inlet conduit within the space above said heat storage material in such manner as to induce carbonate formation upon said accumulator tube from the reaction of said heat storage material with carbon dioxide present in the incoming air.

References Cited

UNITED STATES PATENTS

| 3,000,766 | 9/1961 | Wainer | 134—2 |
| 3,240,262 | 3/1966 | Nybolet | 165—60 |

ROBERT A. O'LEARY, *Primary Examiner.*

CHARLES SUKALO, *Assistant Examiner.*